(12) United States Patent
Gere et al.

(10) Patent No.: US 8,405,727 B2
(45) Date of Patent: Mar. 26, 2013

(54) APPARATUS AND METHOD FOR CALIBRATING IMAGE CAPTURE DEVICES

(75) Inventors: David S. Gere, Palo Alto, CA (US); Ting Chen, Sunnyvale, CA (US); Chad Andrew Bronstein, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 882 days.

(21) Appl. No.: 12/238,898

(22) Filed: Sep. 26, 2008

(65) Prior Publication Data

US 2009/0273679 A1 Nov. 5, 2009

Related U.S. Application Data

(60) Provisional application No. 61/049,716, filed on May 1, 2008.

(51) Int. Cl.
*H04N 17/00* (2006.01)
(52) U.S. Cl. .......................... 348/187; 348/188
(58) Field of Classification Search ........................ None
See application file for complete search history.

(56) References Cited

U.S. PATENT DOCUMENTS

| | | | |
|---|---|---|---|
| 3,363,104 A | 1/1968 | Waite et al. |
| 3,761,947 A | 9/1973 | Volkmann et al. |
| 4,620,222 A | 10/1986 | Baba et al. |
| 5,272,473 A | 12/1993 | Thompson et al. |
| 5,274,494 A | 12/1993 | Rafanelli et al. |
| 5,337,081 A | 8/1994 | Kamiya et al. |
| 5,757,423 A | 5/1998 | Tanaka et al. |
| 6,282,655 B1 | 8/2001 | Given |
| 6,310,662 B1 | 10/2001 | Sunakawa et al. |
| 6,339,429 B1 | 1/2002 | Schug |
| 6,389,153 B1 | 5/2002 | Imai et al. |
| 6,416,186 B1 | 7/2002 | Nakamura |
| 6,516,151 B2 | 2/2003 | Pilu |
| 6,560,711 B1 | 5/2003 | Given et al. |
| 6,561,654 B2 | 5/2003 | Mukawa et al. |
| 6,636,292 B2 | 10/2003 | Roddy et al. |
| 6,807,010 B2 | 10/2004 | Kowarz |
| 6,862,022 B2 | 3/2005 | Slupe |
| 6,877,863 B2 | 4/2005 | Wood et al. |

(Continued)

FOREIGN PATENT DOCUMENTS

| | | |
|---|---|---|
| EP | 167314 | 1/1986 |
| EP | 2053844 | 4/2009 |

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Chieh M Fan
*Assistant Examiner* — Angel L Garces-Rivera
(74) *Attorney, Agent, or Firm* — Fish & Richardson P.C.

(57) ABSTRACT

An apparatus and method are disclosed for calibrating image capture devices, such as the type used in electronic devices. In some embodiments, the electronic device may include at least one array of pixels and a memory coupled to the at least one array of pixels. The electronic device may further include a central processing unit (CPU) coupled to the memory and at least one color filter optically coupled to the at least one array of pixels. The memory may further include one or more storage locations that include a response of the at least one color filter to one or more predetermined wavelengths from a target test source, as well as, one or more storage locations that include a response of one or more baseline color filters.

20 Claims, 5 Drawing Sheets

U.S. PATENT DOCUMENTS

| | | | |
|---|---|---|---|
| 6,903,880 B2 | 6/2005 | Beatson et al. | |
| 6,921,172 B2 | 7/2005 | Ulichney et al. | |
| 6,924,909 B2 | 8/2005 | Lee et al. | |
| 6,930,669 B2 | 8/2005 | Weiner et al. | |
| 6,931,601 B2 | 8/2005 | Vronay et al. | |
| 6,970,080 B1 | 11/2005 | Crouch et al. | |
| 7,028,269 B1 | 4/2006 | Cohen-Solal et al. | |
| 7,058,234 B2 | 6/2006 | Gindele et al. | |
| 7,079,707 B2 | 7/2006 | Baron | |
| 7,123,298 B2 | 10/2006 | Schroeder et al. | |
| 7,307,709 B2 | 12/2007 | Lin et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,453,510 B2 | 11/2008 | Kolehmainen et al. | |
| 7,460,179 B2 | 12/2008 | Pate et al. | |
| 7,512,262 B2 | 3/2009 | Criminisi et al. | |
| 7,551,771 B2 | 6/2009 | England | |
| 7,570,282 B1 * | 8/2009 | Kaplinsky | 348/188 |
| 7,590,335 B2 | 9/2009 | Kobayashi et al. | |
| 7,590,992 B2 | 9/2009 | Koplar et al. | |
| 7,598,980 B2 | 10/2009 | Imai et al. | |
| 7,613,389 B2 | 11/2009 | Suzuki et al. | |
| 7,629,897 B2 | 12/2009 | Koljonen | |
| 7,641,348 B2 | 1/2010 | Yin et al. | |
| 7,653,304 B2 | 1/2010 | Nozaki et al. | |
| 7,658,498 B2 | 2/2010 | Anson | |
| 7,834,846 B1 | 11/2010 | Bell | |
| 7,869,204 B2 | 1/2011 | Bair et al. | |
| 7,901,084 B2 | 3/2011 | Willey et al. | |
| 7,964,835 B2 | 6/2011 | Olsen et al. | |
| 8,044,880 B2 | 10/2011 | Nakamura et al. | |
| 2002/0021288 A1 | 2/2002 | Schug | |
| 2003/0038927 A1 | 2/2003 | Alden | |
| 2003/0086013 A1 | 5/2003 | Aratani | |
| 2003/0117343 A1 | 6/2003 | King | |
| 2004/0193413 A1 | 9/2004 | Wilson et al. | |
| 2005/0132408 A1 | 6/2005 | Dahley et al. | |
| 2005/0168583 A1 | 8/2005 | Thomason | |
| 2005/0182962 A1 | 8/2005 | Given et al. | |
| 2005/0219363 A1 * | 10/2005 | Kohler et al. | 348/187 |
| 2005/0280786 A1 | 12/2005 | Moiroux et al. | |
| 2006/0140452 A1 | 6/2006 | Raynor et al. | |
| 2006/0197843 A1 | 9/2006 | Yoshimatsu | |
| 2007/0027580 A1 | 2/2007 | Ligtenberg et al. | |
| 2007/0177279 A1 | 8/2007 | Cho et al. | |
| 2007/0196095 A1 * | 8/2007 | Perala et al. | 396/155 |
| 2007/0236485 A1 | 10/2007 | Trepte | |
| 2007/0300312 A1 | 12/2007 | Chitsaz et al. | |
| 2008/0062164 A1 | 3/2008 | Bassi et al. | |
| 2008/0131107 A1 | 6/2008 | Ueno | |
| 2008/0158362 A1 * | 7/2008 | Butterworth | 348/187 |
| 2008/0191864 A1 | 8/2008 | Wolfson | |
| 2009/0008683 A1 | 1/2009 | Nishizawa | |
| 2009/0027337 A1 | 1/2009 | Hildreth | |
| 2009/0051797 A1 | 2/2009 | Yao | |
| 2009/0115915 A1 | 5/2009 | Steinberg et al. | |
| 2009/0221368 A1 | 9/2009 | Yen et al. | |
| 2009/0262306 A1 | 10/2009 | Quinn et al. | |
| 2009/0262343 A1 * | 10/2009 | Archibald | 356/246 |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 | 3/2010 | Gere et al. | |
| 2010/0079426 A1 | 4/2010 | Pance et al. | |
| 2010/0079468 A1 | 4/2010 | Pance et al. | |
| 2010/0079653 A1 | 4/2010 | Pance | |
| 2010/0079884 A1 | 4/2010 | Gere et al. | |
| 2010/0083188 A1 | 4/2010 | Pance et al. | |
| 2010/0103172 A1 | 4/2010 | Purdy | |
| 2011/0074931 A1 | 3/2011 | Bilbrey et al. | |
| 2011/0075055 A1 | 3/2011 | Bilbrey | |
| 2011/0115964 A1 | 5/2011 | Gere | |
| 2011/0149094 A1 | 6/2011 | Chen et al. | |
| 2012/0044328 A1 | 2/2012 | Gere | |
| 2012/0076363 A1 | 3/2012 | Kessler et al. | |

FOREIGN PATENT DOCUMENTS

| | | |
|---|---|---|
| JP | 2002354493 | 12/2002 |
| WO | WO93/11631 | 6/1993 |
| WO | WO2007/100057 | 9/2007 |
| WO | WO2009/001512 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

* cited by examiner

APPARATUS AND METHOD FOR CALIBRATING IMAGE CAPTURE DEVICES

CROSS-REFERENCE TO RELATED APPLICATIONS

This application claims the benefit to U.S. Provisional Patent Application No. 61/049,716, filed on May 1, 2008 and entitled "Apparatus and Method for Calibrating Image Capture Devices," the disclosure of which is hereby incorporated herein in its entirety.

BACKGROUND OF THE INVENTION

1. Technical Field

The present invention relates generally to image capture devices, and more particularly to an apparatus and method for calibrating image capture devices.

2. Background

Electronic devices are ubiquitous in society and can be found in everything from wristwatches to cellular telephones. With the proliferation of integrated circuitry, these electronic devices are becoming more and more sophisticated. Many of these electronic devices—especially consumer electronic devices—include the ability to take pictures using an image capture device embedded within the electronic device. The actual image capture devices employed in these electronic devices are often solid-state. Examples of image capture devices are charge coupled devices (CCDs) and complementary metal oxide semiconductor (CMOS) sensors devices. These solid-state type image capture devices are often cost effective (which may be especially important when being implemented in consumer electronics) because they are manufactured using semiconductor fabrication principles.

One disadvantage in utilizing solid state image capture devices, however, is that the color balance may vary between image capture devices due to manufacturing variations among the image capture devices. In other words, despite two electronic devices (such as two CCD cameras) being the same make and model, they may have different color balances so that pictures taken of the same object by each device may depict color variations when compared to one another. Color imbalances of this type may be particularly acute for the red content of the image, due to variations in the red and infrared (IR) content of the illumination source, and the effect of the IR blocking filter.

Accordingly, there is a need for calibrating the color response of image capture devices.

SUMMARY

An apparatus and method are disclosed for calibrating image capture devices, such as the type used in electronic devices. The electronic device may calibrate the response of its pixel and/or pixel processing path to certain wavelengths of light (e.g., the IR wavelength) based upon comparisons between the response of its color filter to the response of a baseline color filter. In some embodiments, the calibration of the electronic device may occur after the electronic device has been manufactured, which allows the electronic device to be calibrated without disassembling the electronic device.

In certain embodiments, the electronic device may include at least one array of pixels and a memory electronically coupled to the at least one array of pixels. The electronic device may further include a central processing unit (CPU) coupled to the memory and at least one color filter optically coupled to at least one array of pixels. The memory may store a response of at least one color filter to one or more predetermined wavelengths from a target test source, as well as, further storing a response of one or more baseline color filters to one or more predetermined wavelengths from a target test source.

Another embodiment takes the form of a method for calibrating an image capture device of an electronic device. The method may include the acts of storing, the color response of one or more baseline filters to a source of light having one or more predetermined wavelengths, storing the color response of one or more filters located within the electronic device to the source of light having one or more predetermined wavelengths, comparing the color response of the one or more baseline filters with the color response of the one or more filters located within the electronic device, and adjusting the response of one or more filters located within the electronic device to correspond to the response of the one or more baseline filters.

Yet another embodiment takes the form of a system for calibrating an image capture device configured to react to a light source of a predetermined wavelength, a calibration pattern optically coupled to the light source, at least one color filter optically coupled to the calibration pattern, a memory coupled to the at least one color filter, the memory comprising one or more storage locations, and a central processing unit (CPU) coupled to the memory. The calibration pattern further comprises one or more regions that emanate a predetermined wavelength, where the one or more regions that emanate a predetermined wavelength may be oriented in substantially close physical proximity within the calibration pattern, and where comparisons between at least two of the one or more regions that emanate a predetermined wavelength may be stored in one or more storage locations of the memory.

BRIEF DESCRIPTION OF THE DRAWINGS

The use of the same reference numerals in different drawings indicates similar or identical items.

DETAILED DESCRIPTION OF THE INVENTION

The following discussion describes various embodiments that may improve camera calibration and, thus, potentially camera performance. Although one or more of these embodiments may be described in detail, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

One embodiment takes the form of an electronic device that may adjust the response of its pixel and/or pixel processing path to certain wavelengths of light (such as the IR wavelength) based upon comparisons between the response of its color filter and stored data, which in some embodiments, corresponds to the response of a baseline color filter. In some embodiments, adjustment of the response of the electronic device's pixel and/or pixel processing path may occur after the electronic device has been manufactured, which allows the electronic device to be calibrated without disassembly. As one example, the response of a pixel processing path may be changed based on one or more measured properties of an optical component or components of the electronic device, such as an infrared filter. That is, a correction value may be determined by comparing the response of the IR filter against an ideal IR filter. This correction value may then be used to change the response of the pixel processing path to account for differences between the device's IR filter and the ideal IR filter, as described in more detail below.

Figure 1:
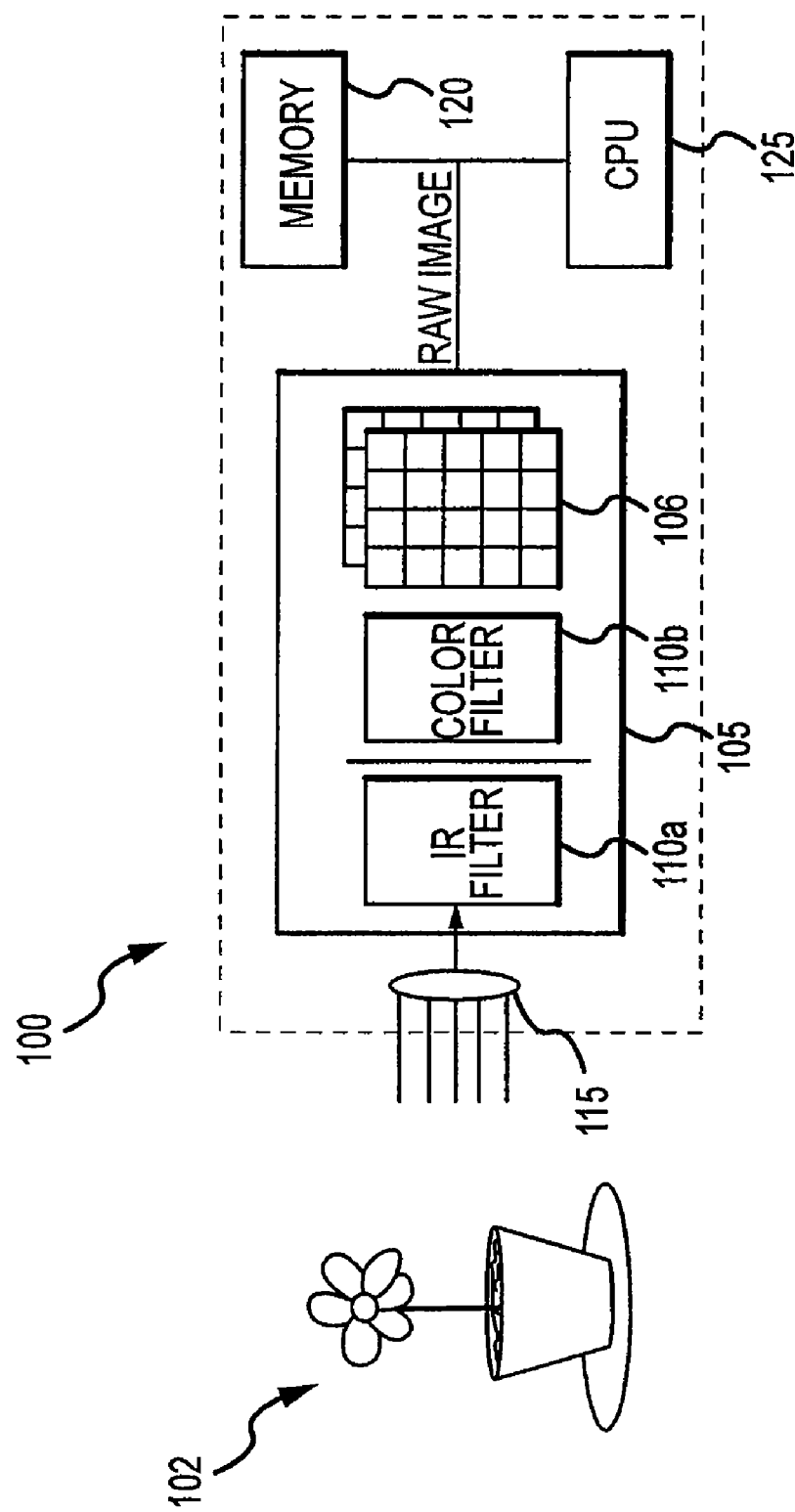
FIG. 1 depicts an electronic device with an exemplary image capture device.

FIG. 1 depicts an exemplary electronic device 100. In this embodiment, the electronic device 100 may be any of many different types of consumer electronic devices, such as computers, cellular telephones, televisions, wristwatches, and/or standalone camera units to name but a few.

An image capture device 105 may be incorporated within the electronic device 100 and may allow the electronic device 100 to have camera-type functionality (e.g., permitting the device to take photographs). The actual image capture device 105 implemented in the electronic device 100 may take various forms and may include one or more arrays of pixels 106, where each pixel has a certain photoelectric response when exposed to an object 102. In some embodiments, the image capture device 105 includes CCDs and/or CMOS image sensors fabricated according to semiconductor manufacturing principles.

Each of the pixels in the array 106 may be pan-chromatic. That is, in the absence of any color filter, each pixel may respond to all wavelengths of visible light (although not necessarily equally to all such wavelengths). As a result the image capture device 105 may further include one or more filters 110A-B. The filters 110A-B may include an IR filter 110A as well as a color filter 110B, where light is filtered by the IR filter 110A prior to being filtered by the color filter 110B. In embodiments where the image capture device is fabricated according to semiconductor manufacturing principles, the filters 110A-B may be integrated within the image capture device 105 at the time the image capture device 105 is manufactured. Furthermore, in some embodiments, the color filter 110B may be an array of red, green, and blue filters arranged in a Bayer-type array pattern—i.e., with twice as many green items in the array as the red and blue so as to mimic the human eye's greater ability to resolve green light. Essentially, the color filter 110B restricts the band of wavelengths of light that may impact the pixel, which in turn makes each such pixel function as if it were sensitive only to that particular set of wavelengths.

During operation, the electronic device 100 may focus on the object 102 through an optional lens 115. The combination of the filters 110A-B and the array 106 may render a "raw" image, where the incoming light to each pixel in the array 106 has been filtered to produce less than all of the colors that make up an image. For example, in some embodiments, each pixel in the array 106 may detect/output one color chosen from the group of red, green, and blue ( the "RGB" color grouping). Since these raw images may contain less than all of the colors required to render the full color image, one or more de-mosaicing algorithms may be implemented. A de-mosaicing algorithm is a digital image process used to interpolate a complete image from the partial raw image received from the color-filtered image sensor. Thus, even though each pixel may render only a single primary color, such as red, green, or blue, the de-mosaicing algorithm may estimate, for each pixel, the color level of all color components rather than a single color component.

In other embodiments, alternative arrangements for the filters 110A-B and/or the arrays 106 may be implemented. For example, the filter 110 may be a Cyan-Yellow-Green-Magenta filter or a Red-Green-Blue-Emerald filter, each of which may require similar de-mosaicing. In still other embodiments, the arrangements for the filters 110A-B and/or the arrays 106 may not require de-mosaicing. For example, some embodiments may include a Foveon X3 sensor or the like, which layers red, green, and blue sensors vertically rather than using a mosaic. Other embodiments may utilize three separate CCDs, one for each color, with each one having a separate color filter.

If de-mosaicing or other algorithms are executed by an embodiment, they may be stored in a memory 120 and executed by a central processing unit (CPU), graphics processor or other suitable processor 125. (The term "CPU" is intended to encompass all suitable processors.) In some embodiments, the memory 120 and/or CPU 125 may be implemented with the image capture device 105. For example, if the image capture device 105 is fabricated using semiconductor manufacturing, then the memory 120 and/or CPU 125 may be implemented as part of the same integrated circuit. As will be described in detail below, one or more color-balancing algorithms also may be stored in the memory 120.

Implementing the filters 110A-B as part of the same circuitry as the array 106 and the other components within the image capture device 105, in general, may make the electronic device 100 cheaper to build, which may be a design consideration in consumer electronic devices. While some embodiments utilize these more cost effective color filter construction, the ability to filter each of the different colors may vary between electronic devices. Thus, in the embodiments where the filters 110A-B are configured to provide RGB filtering, one or more of the red, green, or blue colors may not be as intense, post-filtering in the raw image. As a result, even though two electronic devices (for example, cellular telephones or web cameras) may be the same make and model, they may produce different images, color-wise, of the same object. For example, in many commercial electronic devices, the amount of light passing through the red filter elements will depend on the response of the IR filter 110A, which typically blocks light above 650 nanometers while passing light below 650 nanometers. The manufacturing tolerance on the IR filter 110A is typically +/−10 nm, which may allow appreciable variation in light transmission through the red filter elements, given the typical pass band of the red filters.

For the ease of discussion the remainder of this disclosure will focus on the response of the filters 110A-B with regard to variatons in the IR filter 110A. However, it should be noted that this disclosure applies equally to the response of the filters 110A-B to any wavelength of light.

Figure 2A:
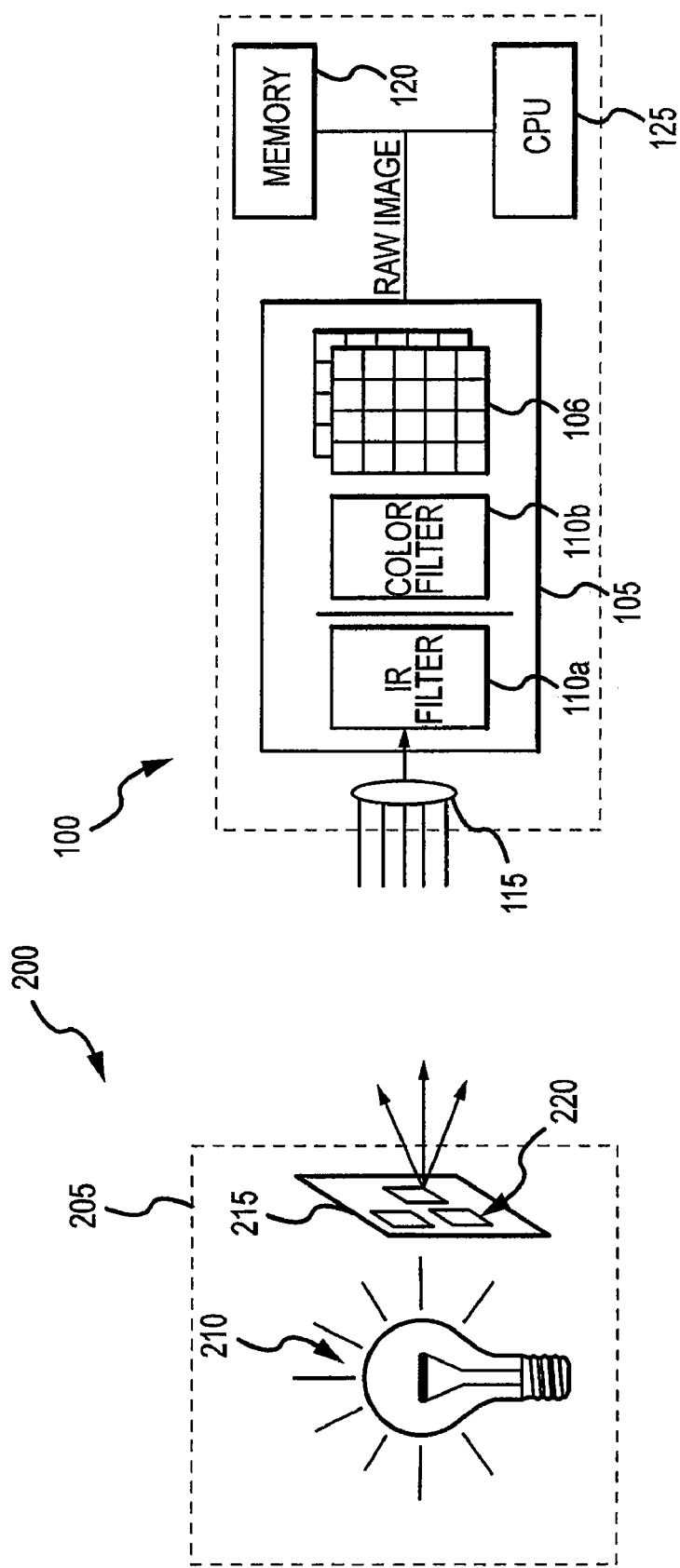
FIG. 2A illustrates an exemplary system that may used to test and calibrate the color response of an image capture device.

FIG. 2A illustrates an exemplary system 200 that may used to test and calibrate the color response of the image capture device 105 and/or the IR filter 110A to wavelengths of IR light. In some embodiments, the system 200 may be capable of testing and calibrating the electronic device 100, for example, in a manufacturing environment as part of the final electronic testing of the electronic device 100 prior to sale.

This may allow the IR filter 110A (which may be integrated within the image capture device 105 in some embodiments) to be tested and calibrated without disassembling the electronic device 100. In other embodiments, the system 200 may be used after the electronic device 100 has been sold, (for example, at a repair shop), to re-test and/or re-calibrate if the electronic device 100 is suspected of malfunctioning.

Referring to the system 200, each of the electronic devices 100 may be exposed to a target test structure 205. The target test structure 205 may include a light source 210 of a controlled wavelength. For example, a low temperature incandescent bulb may be used in some embodiments. Also, or alternatively, the target test structure 205 may include a predetermined calibration pattern 215 with one or more openings 220 that allow light from the light source 210 to emanate toward the image capture device 105 as shown. In some embodiments, the light may shine through the one or more openings 220, while in other embodiments, the light may reflect off the one or more openings 220.

Each of the openings 220 may be configured to emanate a desired wavelength of light. During operation of the system 200, the electronic devices 100 may be exposed to the light emanating from the calibration pattern 215 such that the color response of the image capture device 105 and/or filters 110A-B to IR wavelength of light may be characterized as explained below. This characterization data may be stored in the memory 120. Software or firmware executing on the CPU 125 may then utilize this characterization data to correct for the color filter's response to IR light as described below.

The calibration pattern 215 may be implemented in a variety of ways. In some embodiments, a GRETAG MACBETH® color chart may be used. Other embodiments include the exemplary calibration pattern 250 shown in FIG. 2B.

Figure 2B:
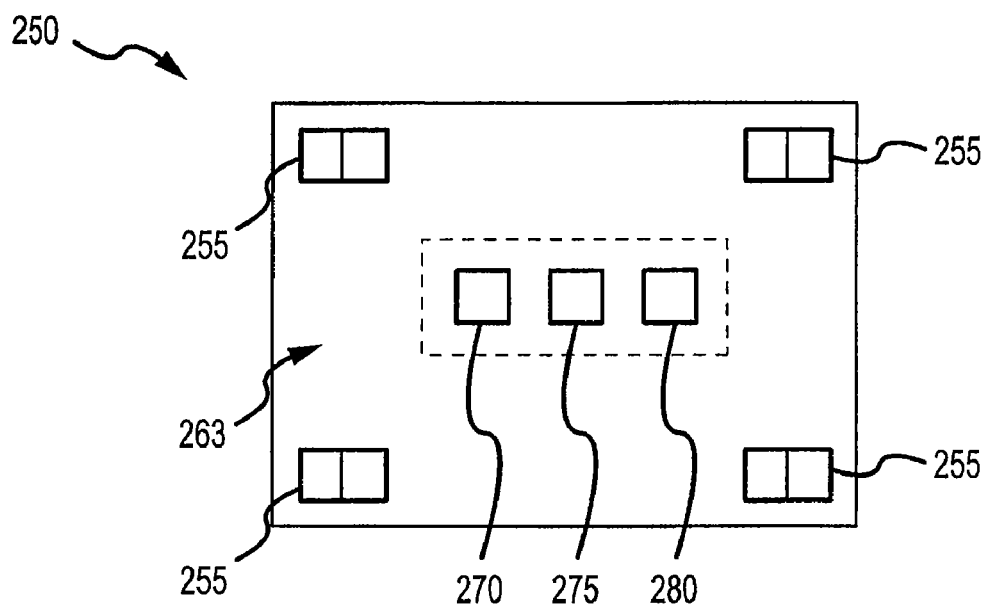
FIG. 2B illustrates an exemplary calibration pattern.

Referring to FIG. 2B, the calibration pattern 250 may include one or more reference points 255. While the color of the reference points may vary in different implementations, in the exemplary calibration pattern 250 shown in FIG. 2B, the one or more reference points 255 are black and white in color. The white and black reference points 255 may be used by the image capture device 105 as the upper and lower limits respectively of possible colors visible to the electronic device 100. The calibration pattern 250 also may include a large grey or neutral region 263 that facilitates the auto-expose and auto-white balance features of the image capture device 105 during calibration.

Furthermore, the calibration pattern 250 may include one or more colored zones 270, 275, and 280. These color zones 270, 275, and 280 may be configured to emanate predetermined wavelengths of light in order to test the response of the image capture device 105. A first color zone 270 may be configured to emit a wavelength from approximately 620 nanometers to 640 nanometers. A second color zone 275 may be configured to emit a wavelength from approximately 640 nanometers to 660. Likewise, a third color zone 280 may be configured to emit a wavelength from approximately 660 nanometers to 680 nanometers. As one example, an ideal transmission characteristic for the IR filter 110A in response to exposure to the calibration pattern 250 may include 100% transmission for 400-640 nanometers, 50% transmission at 650 nanometers, and 0% transmission from 660 nanometers to infinity.

Figure 2C:
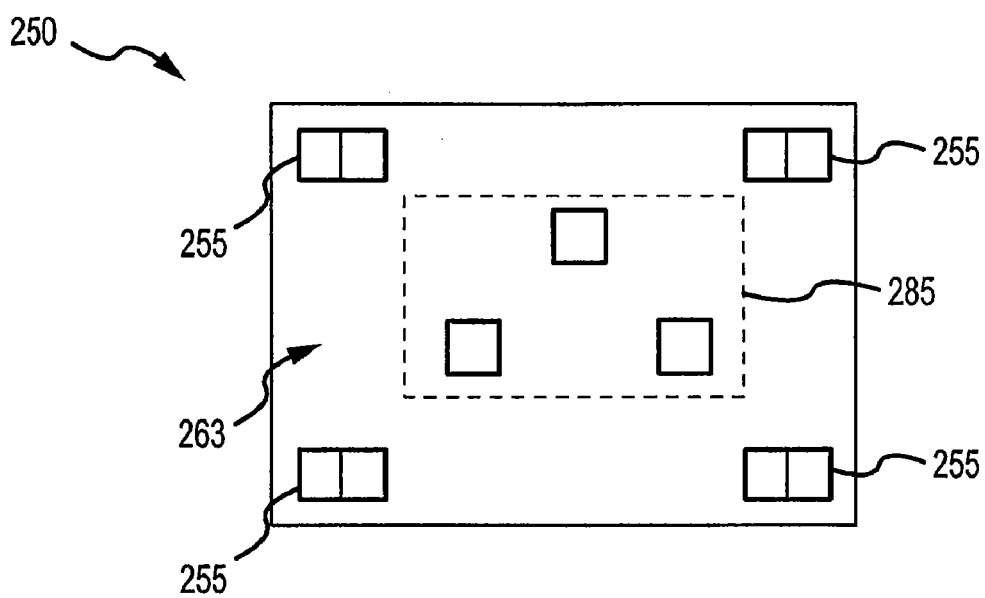
FIG. 2C represents an alternative calibration pattern.
Figure 2D:
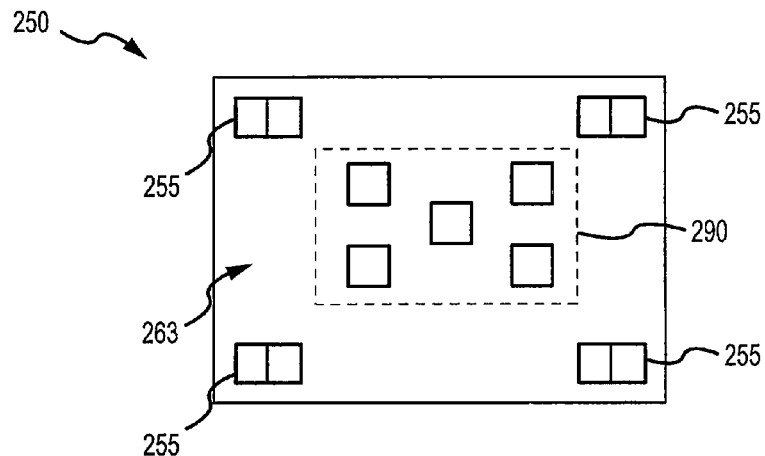
FIG. 2D depicts yet another alternative calibration pattern.

In the embodiment shown in FIG. 2B three such color zones are shown. However, any number of color zones in various orientations are possible. For example, FIGS. 2C and 2D illustrate alternative calibration patterns 285 and 290 having different orientations for the of the color zones.

Figure 3A:
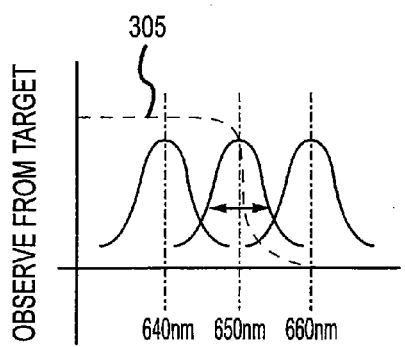
FIG. 3A illustrates an exemplary response of the color filter from the image capture device (dashed line) superimposed on spectral responses of an exemplary calibration pattern.

The transmittance of the IR filter 110A to each of the color zones 270, 275, and 280 is represented in FIG. 3A. Referring to FIG. 3A, the normalized intensity transmittance for each of the color zones 270, 275, and 280 is represented as the abscissa axis. The ordinate axis represents the wavelength λ of the light associated with each of the color zones 270, 275, and 280. As can be appreciated by inspection of FIG. 3A, the light emanating from each of the color zones 270, 275, and 280 may be centered about the exemplary wavelengths (640, 650, and 660 nanometers respectively). The actual transmittance transfer function 305 of the color filter 110, which may represent the wavelengths actually "seen" by the image capture device 100, is also shown.

In the present example, the manufacturing tolerance of the IR cut-off wavelength for the IR filter 110A may be 650±10 nanometers as indicated by the double-sided arrows around the 650 nanometer wavelength in FIG. 3A. This variance in manufacturing tolerance may cause the response of the filters 110A-B to vary between electronic devices 100. In other words, the amount of red "seen" emanating from the color zone 275 (which emits light from 640 to 660 nanometers) by the image capture device 100 may depend on the properties of the IR filter 110A.

In some embodiments, the variance between different IR filters 110A within the electronic devices 100 may be categorized into different "bins" within the total variance. Each bin may represent a range of wavelengths that receive similar adjustment (as is described below). The approximately 20 nanometers of variance around the desired 650 nanometer cut-off wavelength shown in FIG. 3A may be categorized among an equal number of bins. For example, a first bin may be associated with the wavelengths in the 640 to 644 nanometer range, a second bin may be associated with the wavelengths in the 644 to 648 nanometer range, and so on until the 20 nanometer wavelength variance is divided among multiple bins each spanning 4 nanometers. As each IR filter 110A is tested within the system 200, the result may fall somewhere in the 20 nanometer variance. For example, if the IR filter 110A shown in FIG. 2 has a cut-off wavelength of 642 nanometers then it will be associated with the first bin having a range of 640-644 nanometers.

With the IR filters 110A binned in this manner, one or more algorithms may be implemented to adjust the color response characteristics to match a baseline IR filter, where IR filter 110A falling within the same bin may be adjusted similarly. As one example, the embodiment may calculate, via the CPU 125, differences between the response characteristics of the electronic device's filter 110A and an ideal IR filter to the calibration pattern. Such differences may be stored in the memory 120 as a correction constant or set of constants and used by the CPU 120 to adjust image/color data received from the array 106.

Figure 3B:
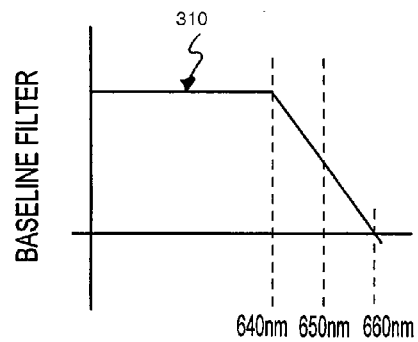
FIG. 3B represents a color filter characteristic based upon empirical measurements of a baseline color filter.

FIG. 3B depicts an exemplary baseline IR filter's characteristic 310. In some embodiments, the exemplary baseline IR filter's characteristic may be based on selecting an IR filter 110A from among a plurality of IR filters to be used in manufacturing the electronic devices 100. A manufacturer of the electronic device 100 may purchase a group image capture devices 105 and/or IR filters 110A from a certain vendor. Samples from within this group of IR filters 110A may be tested, either in response to the calibration pattern 250 or in an alternative systems. From these samples, a baseline filter may be selected that has a cut-off wavelength closest to the desired behavior. For example, the IR filter 110A from the sample that has a wavelength closest to 650 nanometers may be selected as the baseline filter.

As shown in FIG. 3B, the IR filter's characteristic 310 may almost completely transmit light below about 640 nanometers and begin to taper off above that point by emitting about half as much light at 650 nanometers, and then transmitting almost no light at or above 660 nanometers. In some embodiments, the data associated with the baseline filter's response may be stored in the memory 120 at the time the electronic device 100 is manufactured.

By comparing the IR filter's characteristic 310 with the characteristics of the IR filter 110A associated with the established bins, adjustment factors for the IR filter 110A may be determined. For example, in some embodiments one or more look-up tables may be constructed so that for a particular bin pixel intensity measurements in the raw image may be scaled by values in the look-up tables. Thus, if the IR filter 110A has a cutoff wavelength of 642 nanometers and therefore falls within a first bin (because they have a wavelength range of 640-644 nanometers), then the measured pixel intensities in the raw image coming may be scaled up according to the values in the look-up table by the CPU 125. Utilizing a look-up table in this manner may reduce the calculation requirements of the CPU 125. In other embodiments, instead of using look-up tables the amount of adjustment for each of the pixel intensities may be calculated according to mathematical algorithms.

In some embodiments, the ratios of the response of the IR filter 110A to each of the color zones 270, 275, and/or 280 may be made. By using ratios of the response to each of the color zones 270, 275, and/or 280, variations (e.g., due to light source aging, temperature variations, etc.) may be compensated for. For example, as the light source 210 ages the intensity of the light emanating from any one of the color zones 270, 275, and/or 280 may fade. Despite any one of the color zones 270, 275, and/or 280 fading as the light source 210 ages, if the ratio of the response to the color zones 270, 275, and/or 280 is used instead of just one of the values, then aging or other variations may cancel each other out. Mathematically, this concept may be expressed as:

$$\text{Intensity} = \frac{\downarrow \text{Green}}{\downarrow \text{Red}}.$$

Thus, the intensity of the red primary color alone over time may be decreasing if monitored alone as a representation of image intensity, but the ratio of the green primary color to the red primary color would track this out if it were used as a measure of image intensity.

In some embodiments, the empirical calibration data and/or response of the IR filter 110A to the target test structure 205 may be tracked by the manufacturer of the electronic device 100. The manufacturer may keep track of which bin the IR filter 110A falls in for each electronic device manufactured. In this manner, the manufacturer may later decide to update the look-up tables or mathematical algorithms used to calculate color adjustment values by updating the values stored in the memory 120. For example, this may occur during a firmware update.

This information may assist the manufacturer in the event that a malfunction is discovered with the electronic devices 100 that may be associated with a batch of filters 110A-B, such as filters from a particular manufacturer.

Figure 4:
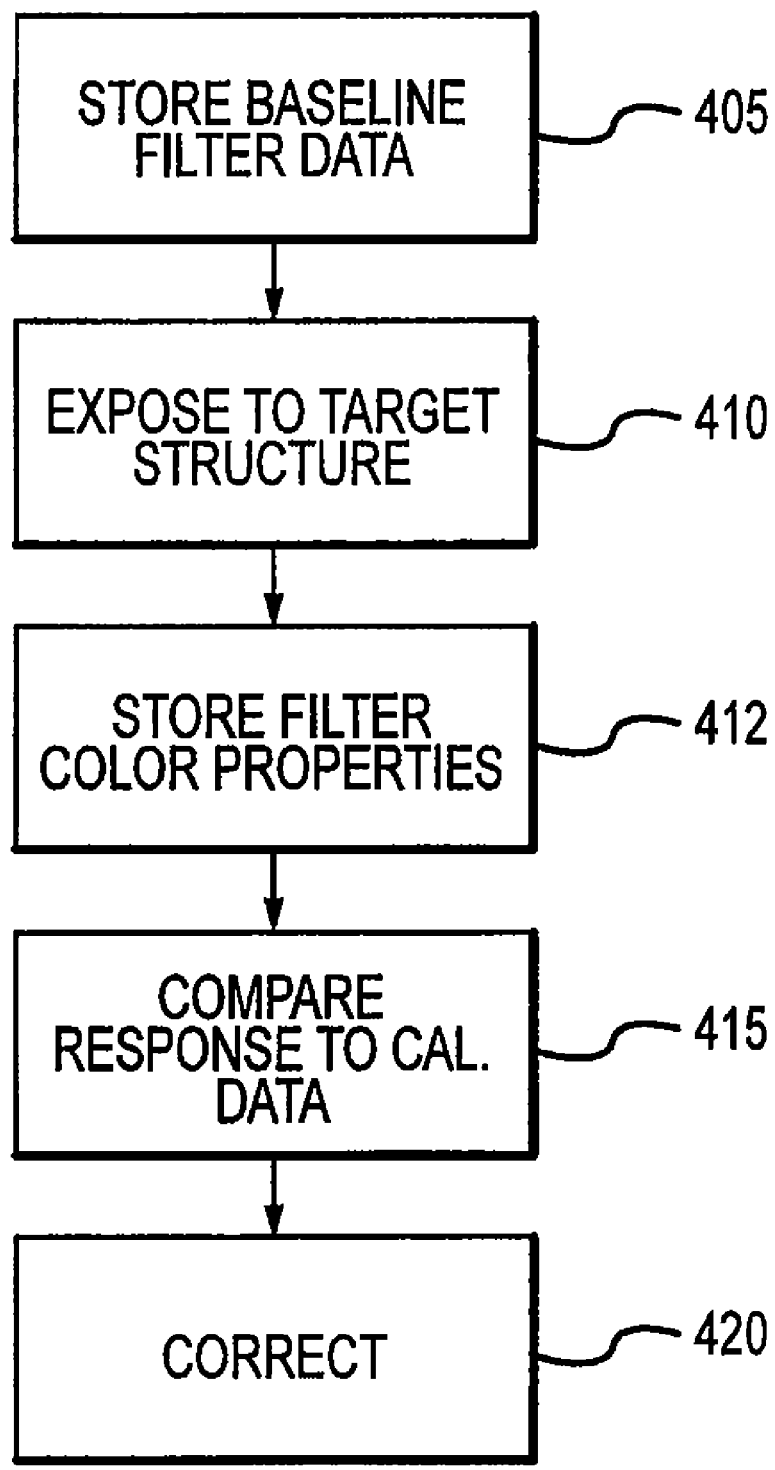
FIG. 4 illustrates an exemplary flowchart to calibrate one or more image capture devices.

FIG. 4 is an exemplary flowchart of a method that may be implemented by the electronic device 100, or associated with software and/or hardware, to calibrate the image capture device 105. In operation 405, data associated with the baseline IR filter to the target test structure 205, may be stored in the memory 120. Note that multiple sets of calibration data, each associated with different baseline filter responses (for example, mimicking filters associated with different colors) may be stored in the memory 120.

The electronic device 100 is exposed to the target test structure 205 in operation 410. In some embodiments, the electronic device 100 is exposed to the same target structure that the high quality IR filter was exposed to.

During the exposure of operation 410, a ratiometric comparison of wavelengths of light emanating from the one or more openings 220 may be made by the CPU 125. As described above, this ratiometric comparison may allow variations—e.g., due to aging of the target test structure 205—to be negated or minimized. The results from the exposure that occurred in operation 410 may be stored in the memory in operation 412.

In operation 415, the stored ratiometric comparison may be compared to data from the baseline filter to determine the spectral properties of the IR filter 110A. With the comparison between the IR properties of the IR filter 110A and the spectral properties of the baseline filter made, one or more correction methods may be implemented as shown in operation 420. The one or more correction methods may be executed by the CPU 125, for example, by executing firmware or software stored in the memory 120 when the electronic device 100 was built.

The actual adjustments made by the exemplary methods in operation 420 may vary based upon the function being performed by the image capture device 105. For example white balancing the raw image may include calculating the maximum and minimum operating ranges based upon the black and white reference points 255. If 8-bit color is used, the black point may be associated with a binary value of 0 while the white point may be associated with a binary value of 255. Accordingly, measuring the intensity of each of the red, green, and blue channels, may yield the following relationships:

$$Gain_{red} = \frac{255}{200} \quad Gain_{green} = \frac{255}{255} \quad Gain_{blue} = \frac{255}{128}.$$

These may be used as the expected gains and coded into the firmware for color balancing operations. The cut-off wavelength of the IR filter 110A may vary, for example the IR filter 110A may have a higher cutoff wavelength as depicted by the right hand side of the double sided arrow in FIG. 3A. In the event that the IR filter 110A has a higher IR cutoff wavelength, then the expected intensity value of the red channel may be higher than expected and skew the color balancing operations. Accordingly, the $Gain_{red}$ may be adjusted based upon the color filter's measured response to the target test structure 205, such as when the image capture device 105 is performing a white balance.

In some embodiments, the methods used to correct the color filter 110 may be modified by connecting the image capture device 100 to a data feed from the manufacturer. For example, if the electronic device 100 is a multifunctional cellular telephone (such as the iPhone manufactured by Apple Inc. of Cupertino, Calif.), then connecting the cellular telephone to the manufacturer's web site through the Internet (e.g., wired or wireless) may periodically update the data and/or methods used to correct the color filter 110 that are stored in the firmware.

Although the present invention has been described with reference to certain embodiments, persons skilled in the art will recognize that changes may be made in form and detail without departing from the spirit and scope of the invention.

What is claimed is:

1. An electronic image capture device, comprising:
   an array of pixels configured for receiving wavelengths of light;
   a filter coupled to the array of pixels and configured for filtering the wavelengths of light;
   a processor coupled to the array and configured for:
   selecting a correction value based on data received from the array and a baseline value, the baseline value being a ratiometric comparison of intensities of the wavelengths of light passing through a baseline filter; and
   applying the correction value to an image captured by the device.

2. The electronic device of claim 1, wherein the baseline value is a ratiometric comparison of an intensity of a first one of the wavelengths of light to an intensity of a second one of the wavelengths of light.

3. The electronic device of claim 1, wherein the correction value comprises at least one correction constant.

4. The electronic device of claim 1, wherein one of the wavelengths includes a wavelength in the infrared spectrum.

5. The electronic device of claim 1, wherein:
   the filter comprises an infrared blocking filter; and
   one of the wavelengths includes a wavelength near the cut-off wavelength of the infrared blocking filter.

6. The electronic device of claim 1, wherein the baseline value is updated when a firmware executed by the processor is updated.

7. The electronic device of claim 1, wherein a response of the filter is calculated based on ratios of the wavelengths measured from a plurality of wavelength emanating regions.

8. The electronic device of claim 1, wherein the response of the filter is stored in one or more memory locations after the electronic device has been manufactured.

9. The electronic device of claim 1, wherein the data received from the array is measured in response to the wavelengths.

10. A method for calibrating an electronic image capture device, comprising:
    storing, in a memory within the electronic device, a first color response of a baseline filter;
    storing, in the memory within the electronic device, a second color response of a filter located within the electronic device to a light source having predetermined wavelengths;
    comparing a first ratiometric value based on intensities of the first color response of the baseline filter with a second ratiometric value based on intensities of the second color response of the filter located within the electronic device,
    wherein the first ratiometric value is determined based on a comparison of intensities of the predetermined wavelengths of light passing through the baseline filter; and
    based on the comparison, adjusting the second color response of the filter located within the electronic device.

11. The method of claim 10, further comprising exposing the electronic device to a target test structure after the electronic device has been manufactured.

12. The method of claim 11, wherein the target test structure comprises calibration patterns that include a plurality of wavelength emanating regions.

13. The method of claim 12, further comprising measuring the intensity ratios of the filter located within the electronic device from at least two of the plurality of wavelength emanating regions.

14. The method of claim 13, wherein measuring the ratios of color responses is executed in a processor within the electronic device.

15. The method of claim 14, further comprising updating the first color response of the baseline filter when a firmware executed by the processor is updated.

16. The method of claim 10, wherein at least one of the predetermined wavelengths of light is in the infrared range.

17. The method of claim 10, further comprising determining the first color response of the baseline filter based on the light source having predetermined wavelengths.

18. A system for calibrating an image capture device comprising:
    at least one color filter that is operative to react to a combination of a calibration pattern and a light source that is optically coupled to the at least one color filter;
    a memory coupled to the at least one color filter, the memory comprising one or more storage locations; and
    a processor accessing the memory;
    wherein the calibration pattern comprises two or more regions that emanate a plurality of predetermined wavelengths;
    wherein the two or more regions that emanate a plurality of predetermined wavelengths are oriented in substantially close physical proximity within the calibration pattern; and
    wherein a comparison between outputs of at least two of the two or more regions that emanate predetermined wavelengths is stored in one or more storage locations of the memory.

19. The system of claim 18, wherein a response of one or more baseline color filters to the one or more regions that each emanates a predetermined wavelength is stored in the one or more storage locations of the memory.

20. The system of claim 19, wherein the comparisons between the outputs of at least two of the two or more regions that emanate predetermined wavelengths are ratiometric comparisons.

* * * * *